United States Patent
Petri et al.

(10) Patent No.: US 9,235,474 B1
(45) Date of Patent: Jan. 12, 2016

(54) SYSTEMS AND METHODS FOR MAINTAINING A VIRTUAL FAILOVER VOLUME OF A TARGET COMPUTING SYSTEM

(75) Inventors: Robert Petri, Santa Clara, CA (US); Eric Lalonde, Santa Clara, CA (US); Vito Caputo, San Mateo, CA (US)

(73) Assignee: Axcient, Inc., Mountain View, CA (US)

( * ) Notice: Subject to any disclaimer, the term of this patent is extended or adjusted under 35 U.S.C. 154(b) by 466 days.

(21) Appl. No.: 13/030,073

(22) Filed: Feb. 17, 2011

(51) Int. Cl.
*G06F 11/14* (2006.01)

(52) U.S. Cl.
CPC .................... *G06F 11/1448* (2013.01)

(58) Field of Classification Search
CPC ............ G06F 11/1469; G06F 11/1458; G06F 11/1448; G06F 11/1471; G06F 11/1662; G06F 11/1415
USPC .................... 714/4.11, 6.1, 6.23, 13
See application file for complete search history.

(56) References Cited

U.S. PATENT DOCUMENTS

| | | | |
|---|---|---|---|
| 5,574,905 A | 11/1996 | deCarmo | |
| 6,122,629 A | 9/2000 | Walker et al. | |
| 6,205,527 B1 * | 3/2001 | Goshey ............... | G06F 11/1458 711/162 |
| 6,233,589 B1 * | 5/2001 | Balcha et al. ................. | 707/625 |
| 6,272,492 B1 | 8/2001 | Kay | |
| 6,411,985 B1 | 6/2002 | Fujita et al. | |
| 6,604,236 B1 | 8/2003 | Draper et al. | |
| 6,629,110 B2 * | 9/2003 | Cane et al. .................... | 707/703 |
| 6,651,075 B1 * | 11/2003 | Kusters et al. | |
| 6,971,018 B1 * | 11/2005 | Witt et al. .................... | 713/187 |
| 7,024,581 B1 * | 4/2006 | Wang ................. | G06F 11/1417 713/2 |
| 7,085,904 B2 * | 8/2006 | Mizuno et al. ................ | 711/162 |
| 7,266,655 B1 | 9/2007 | Escabi, II et al. | |
| 7,401,192 B2 | 7/2008 | Stakutis et al. | |
| 7,406,488 B2 | 7/2008 | Stager et al. | |
| 7,546,323 B1 | 6/2009 | Timmins et al. | |
| 7,620,765 B1 * | 11/2009 | Ohr et al. .......................... | 711/4 |
| 7,647,338 B2 | 1/2010 | Lazier et al. | |
| 7,676,763 B2 | 3/2010 | Rummel | |
| 7,730,425 B2 | 6/2010 | de los Reyes et al. | |
| 7,743,038 B1 * | 6/2010 | Goldick ........................ | 707/694 |
| 7,752,487 B1 | 7/2010 | Feeser et al. | |
| 7,769,731 B2 | 8/2010 | O'Brien | |
| 7,797,582 B1 * | 9/2010 | Stager et al. .................... | 714/42 |
| 7,809,688 B2 | 10/2010 | Cisler et al. | |
| 7,832,008 B1 | 11/2010 | Kraemer | |

(Continued)

OTHER PUBLICATIONS

Caputo, "Systems and Methods for Restoring a File", U.S. Appl. No. 12/895,275, filed Sep. 30, 2010.

(Continued)

*Primary Examiner* — Loan L. T. Truong
(74) *Attorney, Agent, or Firm* — Carr & Ferrell LLP

(57) ABSTRACT

Some of the methods provided herein may include periodically revising a mirror of the target computing system, according to a predetermined backup schedule, the mirror being stored on the virtual failover volume resident on an appliance that is operatively associated with the target computing system, by periodically comparing the mirror to a configuration of the target computing system to determine changed data blocks relative to the mirror, storing the changed data blocks as one or more differential files in the virtual failover volume, and incorporating the changed data blocks into the mirror. In some embodiments, the systems and methods may be utilized to resparsify the virtual failover volume.

27 Claims, 6 Drawing Sheets

(56) References Cited

U.S. PATENT DOCUMENTS

| | | | |
|---|---|---|---|
| 7,844,850 B2 | 11/2010 | Yasuzato | |
| 7,873,601 B1* | 1/2011 | Kushwah | 707/654 |
| 7,930,275 B2* | 4/2011 | Chen et al. | 707/674 |
| 7,966,293 B1 | 6/2011 | Owara et al. | |
| 8,037,345 B1* | 10/2011 | Iyer et al. | 714/6.12 |
| 8,046,632 B2 | 10/2011 | Miwa et al. | |
| 8,060,476 B1* | 11/2011 | Afonso et al. | 707/649 |
| 8,099,391 B1* | 1/2012 | Monckton | 707/647 |
| 8,099,572 B1* | 1/2012 | Arora | G06F 13/28 707/640 |
| 8,117,163 B2 | 2/2012 | Brown et al. | |
| 8,200,926 B1 | 6/2012 | Stringham | |
| 8,224,935 B1 | 7/2012 | Bandopadhyay et al. | |
| 8,244,914 B1 | 8/2012 | Nagarkar | |
| 8,245,156 B2 | 8/2012 | Mouilleseaux et al. | |
| 8,260,742 B2 | 9/2012 | Cognigni et al. | |
| 8,279,174 B2 | 10/2012 | Jee et al. | |
| 8,296,410 B1 | 10/2012 | Myhill et al. | |
| 8,321,688 B2 | 11/2012 | Auradkar et al. | |
| 8,332,442 B1 | 12/2012 | Greene | |
| 8,352,717 B2* | 1/2013 | Campbell et al. | 713/2 |
| 8,381,133 B2 | 2/2013 | Iwema et al. | |
| 8,402,087 B2 | 3/2013 | O'Shea et al. | |
| 8,407,190 B2* | 3/2013 | Prahlad et al. | 707/692 |
| 8,412,680 B1 | 4/2013 | Gokhale et al. | |
| 8,504,785 B1 | 8/2013 | Clifford et al. | |
| 8,549,432 B2 | 10/2013 | Warner | |
| 8,572,337 B1 | 10/2013 | Gokhale et al. | |
| 8,589,350 B1* | 11/2013 | Lalonde et al. | 707/639 |
| 8,589,913 B2* | 11/2013 | Jelvis et al. | 717/174 |
| 8,600,947 B1 | 12/2013 | Freiheit et al. | |
| 8,601,389 B2 | 12/2013 | Schulz et al. | |
| 8,606,752 B1 | 12/2013 | Beatty et al. | |
| 8,639,917 B1 | 1/2014 | Ben-Shaul et al. | |
| 8,676,273 B1 | 3/2014 | Fujisaki | |
| 8,886,611 B2* | 11/2014 | Caputo | 707/681 |
| 8,924,360 B1 | 12/2014 | Caputo | |
| 8,954,544 B2 | 2/2015 | Edwards | |
| 9,104,621 B1* | 8/2015 | Caputo | G06F 11/1469 |
| 2001/0034737 A1* | 10/2001 | Cane | G06F 11/1451 |
| 2001/0056503 A1 | 12/2001 | Hibbard | |
| 2002/0169740 A1 | 11/2002 | Korn | |
| 2003/0011638 A1 | 1/2003 | Chung | |
| 2003/0158873 A1* | 8/2003 | Sawdon et al. | 707/204 |
| 2003/0208492 A1* | 11/2003 | Winiger et al. | 707/100 |
| 2004/0044707 A1* | 3/2004 | Richard | 707/204 |
| 2004/0073560 A1 | 4/2004 | Edwards | |
| 2004/0093474 A1* | 5/2004 | Lin et al. | 711/162 |
| 2004/0233924 A1 | 11/2004 | Bilak et al. | |
| 2004/0260973 A1 | 12/2004 | Michelman | |
| 2005/0010835 A1* | 1/2005 | Childs | G06F 11/1456 714/6.12 |
| 2005/0027748 A1 | 2/2005 | Kisley | |
| 2005/0154937 A1* | 7/2005 | Achiwa | G06F 11/2023 714/6.3 |
| 2005/0171979 A1* | 8/2005 | Stager et al. | 707/200 |
| 2005/0223043 A1* | 10/2005 | Randal et al. | 707/200 |
| 2005/0278583 A1* | 12/2005 | Lennert et al. | 714/43 |
| 2005/0278647 A1 | 12/2005 | Leavitt et al. | |
| 2006/0013462 A1 | 1/2006 | Sadikali | |
| 2006/0047720 A1 | 3/2006 | Kulkarni et al. | |
| 2006/0064416 A1 | 3/2006 | Sim-Tang | |
| 2006/0224636 A1 | 10/2006 | Kathuria et al. | |
| 2007/0033301 A1* | 2/2007 | Aloni et al. | 710/22 |
| 2007/0112895 A1 | 5/2007 | Ahrens et al. | |
| 2007/0176898 A1 | 8/2007 | Suh | |
| 2007/0180207 A1 | 8/2007 | Garfinkle | |
| 2007/0204166 A1 | 8/2007 | Tome et al. | |
| 2007/0208918 A1* | 9/2007 | Harbin et al. | 711/162 |
| 2007/0220029 A1 | 9/2007 | Jones et al. | |
| 2007/0226400 A1* | 9/2007 | Tsukazaki | 711/102 |
| 2007/0233699 A1* | 10/2007 | Taniguchi et al. | 707/10 |
| 2007/0250302 A1* | 10/2007 | Xu | G06F 13/105 703/20 |
| 2007/0260842 A1 | 11/2007 | Faibish et al. | |
| 2007/0276916 A1* | 11/2007 | McLoughlin | G06F 8/68 709/208 |
| 2007/0283017 A1 | 12/2007 | Anand et al. | |
| 2007/0283343 A1* | 12/2007 | Aridor et al. | 717/174 |
| 2007/0288525 A1 | 12/2007 | Stakutis et al. | |
| 2007/0288533 A1 | 12/2007 | Srivastava et al. | |
| 2007/0294321 A1 | 12/2007 | Midgley et al. | |
| 2008/0005468 A1 | 1/2008 | Faibish et al. | |
| 2008/0010422 A1* | 1/2008 | Suzuki | G06F 11/1471 711/162 |
| 2008/0027998 A1 | 1/2008 | Hara | |
| 2008/0036743 A1 | 2/2008 | Westerman et al. | |
| 2008/0082310 A1 | 4/2008 | Sandorfi et al. | |
| 2008/0141018 A1* | 6/2008 | Tanaka et al. | 713/2 |
| 2008/0162590 A1* | 7/2008 | Kundu et al. | 707/202 |
| 2008/0162607 A1 | 7/2008 | Torii et al. | |
| 2008/0201315 A1 | 8/2008 | Lazier et al. | |
| 2008/0229050 A1 | 9/2008 | Tillgren | |
| 2008/0307345 A1 | 12/2008 | Hart et al. | |
| 2008/0307527 A1 | 12/2008 | Kaczmarski et al. | |
| 2009/0164527 A1 | 6/2009 | Spektor et al. | |
| 2009/0185500 A1 | 7/2009 | Mower et al. | |
| 2009/0216973 A1* | 8/2009 | Nakajima et al. | 711/162 |
| 2009/0309849 A1 | 12/2009 | Iwema et al. | |
| 2009/0319653 A1* | 12/2009 | Lorenz et al. | 709/224 |
| 2009/0327964 A1 | 12/2009 | Mouilleseaux et al. | |
| 2010/0077165 A1* | 3/2010 | Lu | G06F 11/1451 711/162 |
| 2010/0095077 A1 | 4/2010 | Lockwood | |
| 2010/0104105 A1 | 4/2010 | Schmidt et al. | |
| 2010/0107155 A1 | 4/2010 | Banerjee et al. | |
| 2010/0114832 A1 | 5/2010 | Lillibridge et al. | |
| 2010/0165947 A1 | 7/2010 | Taniuchi et al. | |
| 2010/0179973 A1 | 7/2010 | Carruzzo | |
| 2010/0192103 A1 | 7/2010 | Cragun et al. | |
| 2010/0205152 A1 | 8/2010 | Ansari et al. | |
| 2010/0228999 A1* | 9/2010 | Maheshwari et al. | 713/189 |
| 2010/0235831 A1* | 9/2010 | Dittmer | 718/1 |
| 2010/0262637 A1* | 10/2010 | Akagawa | G06F 17/302 707/822 |
| 2010/0268689 A1 | 10/2010 | Gates et al. | |
| 2010/0318748 A1 | 12/2010 | Ko et al. | |
| 2010/0325377 A1* | 12/2010 | Lango et al. | 711/162 |
| 2010/0332454 A1* | 12/2010 | Prahlad | G06F 17/3002 707/654 |
| 2011/0041004 A1 | 2/2011 | Miwa et al. | |
| 2011/0047405 A1 | 2/2011 | Marowsky-Bree et al. | |
| 2011/0055399 A1 | 3/2011 | Tung et al. | |
| 2011/0055471 A1 | 3/2011 | Thatcher et al. | |
| 2011/0055500 A1* | 3/2011 | Sasson et al. | 711/162 |
| 2011/0082998 A1* | 4/2011 | Boldy et al. | 711/173 |
| 2011/0106768 A1* | 5/2011 | Khanzode et al. | 707/646 |
| 2011/0154268 A1 | 6/2011 | Trent, Jr. et al. | |
| 2011/0218966 A1* | 9/2011 | Barnes | G06F 17/30079 707/645 |
| 2011/0238937 A1* | 9/2011 | Murotani et al. | 711/162 |
| 2011/0264785 A1 | 10/2011 | Newman et al. | |
| 2011/0265143 A1 | 10/2011 | Grube et al. | |
| 2011/0302502 A1 | 12/2011 | Hart et al. | |
| 2012/0013540 A1 | 1/2012 | Hogan | |
| 2012/0065802 A1 | 3/2012 | Seeber et al. | |
| 2012/0084501 A1 | 4/2012 | Watanabe et al. | |
| 2012/0124307 A1* | 5/2012 | Ashutosh et al. | 711/162 |
| 2012/0130956 A1* | 5/2012 | Caputo | G06F 11/1469 707/679 |
| 2012/0131235 A1* | 5/2012 | Nageshappa et al. | 710/22 |
| 2012/0179655 A1* | 7/2012 | Beatty et al. | 707/646 |
| 2012/0204060 A1* | 8/2012 | Swift et al. | 714/15 |
| 2012/0210398 A1 | 8/2012 | Triantafillos et al. | |
| 2013/0018946 A1 | 1/2013 | Brown et al. | |
| 2013/0024426 A1 | 1/2013 | Flowers et al. | |
| 2013/0036095 A1 | 2/2013 | Titchener et al. | |
| 2013/0091183 A1* | 4/2013 | Edwards et al. | 707/803 |
| 2013/0091471 A1 | 4/2013 | Gutt et al. | |
| 2013/0166511 A1 | 6/2013 | Ghatty et al. | |
| 2013/0238752 A1 | 9/2013 | Park et al. | |
| 2013/0318046 A1 | 11/2013 | Clifford et al. | |
| 2014/0006858 A1 | 1/2014 | Helfman et al. | |
| 2014/0032498 A1 | 1/2014 | Lalonde et al. | |

(56) References Cited

U.S. PATENT DOCUMENTS

| | | | |
|---|---|---|---|
| 2014/0047081 | A1 | 2/2014 | Edwards |
| 2014/0053022 | A1 | 2/2014 | Forgette et al. |
| 2014/0089619 | A1 | 3/2014 | Khanna et al. |
| 2014/0149358 | A1 | 5/2014 | Aphale et al. |
| 2014/0189680 | A1 | 7/2014 | Kripalani |
| 2014/0303961 | A1 | 10/2014 | Leydon et al. |
| 2015/0046404 | A1 | 2/2015 | Caputo |
| 2015/0095691 | A1 | 4/2015 | Edwards |

OTHER PUBLICATIONS

Notice of Allowance, mailed Sep. 12, 2013, U.S. Appl. No. 13/437,738, filed Apr. 2, 2012.
Office Action, mailed Apr. 10, 2014, U.S. Appl. No. 13/570,161, filed Aug. 8, 2012.
Notice of Allowance, mailed Sep. 26, 2014, U.S. Appl. No. 12/895,275, filed Sep. 30, 2010.
Notice of Allowance, mailed Sep. 15, 2014, U.S. Appl. No. 13/363,234, filed Jan. 31, 2012.
Notice of Allowance, mailed Oct. 20, 2014, U.S. Appl. No. 13/570,161, filed Aug. 8, 2012.
Non-Final Office Action, mailed Jul. 28, 2014, U.S. Appl. No. 13/671,498, filed Nov. 7, 2012.
Final Office Action, mailed May 20, 2014, U.S. Appl. No. 13/633,695, filed Oct. 2, 2012.
Corrected Notice of Allowability, mailed Nov. 3, 2014, U.S. Appl. No. 13/570,161, filed Aug. 8, 2012.
Corrected Notice of Allowability, mailed Dec. 30, 2014, U.S. Appl. No. 13/570,161, filed Aug. 8, 2012.
Non-Final Office Action, mailed Nov. 5, 2014, U.S. Appl. No. 13/789,578, filed Mar. 7, 2013.
Non-Final Office Action, mailed Nov. 12, 2014, U.S. Appl. No. 14/037,231, filed Sep. 25, 2013.
Final Office Action, mailed Feb. 24, 2015, U.S. Appl. No. 13/671,498, filed Nov. 7, 2012.
Non-Final Office Action, mailed Feb. 10, 2015, U.S. Appl. No. 13/789,565, filed Mar. 7, 2013.
Final Office Action, mailed Apr. 1, 2015, U.S. Appl. No. 14/037,231, filed Sep. 25, 2013.
Li et al., "Efficient File Replication," U.S. Appl. No. 13/671,498, filed Nov. 7, 2012.
Notice of Allowance, mailed Sep. 8, 2015, U.S. Appl. No. 14/037,231, filed Sep. 25, 2013.
Notice of Allowance of U.S. Appl. No. 13/789,578, filed Mar. 7, 2013, mailed Oct. 21, 2015.
Non-Final Office Action for U.S. Appl. No. 13/789,565, filed Mar. 7, 2013, mailed Oct. 30, 2015.

\* cited by examiner

SYSTEMS AND METHODS FOR MAINTAINING A VIRTUAL FAILOVER VOLUME OF A TARGET COMPUTING SYSTEM

CROSS-REFERENCE TO RELATED APPLICATIONS

This application relates to U.S. patent application Ser. No. 12/895,275, entitled "SYSTEMS AND METHODS FOR RESTORING A FILE," filed on Sep. 30, 2010, which is hereby incorporated by reference herein in its entirety, including all references cited therein.

FIELD OF THE INVENTION

The present invention relates generally to systems and methods for maintaining a virtual failover volume of a target computing system, and more specifically, but not by way of limitation, to systems and methods for maintaining a virtual failover volume of a target computing system that may be utilized by a virtual machine to create a virtual failover computing system that approximates the configuration of the target computing system, upon the occurrence of a failover event.

BACKGROUND

Generally speaking, the systems and methods provided herein may be adapted to maintain a "ready to execute" virtual failover volume of a target computing system. The virtual failover system may be executed by a virtual machine to assume the functionality target computing system upon the occurrence of a failover event.

The systems and methods may maintain the virtual failover volume in a "ready to execute: state by periodically revising a mirror of the target computing system and store the periodically revised mirror in the virtual failover volume. The ability of the systems and methods to periodically revise the mirror of the target computing system ensures that upon the occurrence of a failover event, a virtual machine may execute the periodically revised mirror to create a virtual failover computing system that may assume the configuration of the target computing system without substantial delay.

SUMMARY OF THE INVENTION

According to exemplary embodiments, the present invention provides for a method for maintaining a virtual failover volume of a target computing system that includes: (a) periodically revising a mirror of the target computing system, according to a predetermined backup schedule, the mirror being stored on the virtual failover volume resident on an appliance that is operatively associated with the target computing system, by: (i) periodically comparing the mirror to a configuration of the target computing system to determine changed data blocks relative to the mirror; (ii) storing the changed data blocks as one or more differential files in the virtual failover volume, the one or more differential files being stored separately from the mirror; and (iii) incorporating the changed data blocks into the mirror; (b) upon the occurrence of a failover event, creating a bootable image file from at least one of the mirror and one or more differential files; and (c) booting the bootable image file via a virtual machine on the appliance to create a virtual failover computing system that substantially corresponds to the target computing system at an arbitrary point in time.

According to other embodiments, systems for maintaining a virtual failover volume of a target computing system may include: (a) a memory for storing computer readable instructions for maintaining a virtual failover volume of a file structure of a target computing system; and (b) a processor configured to execute the instructions stored in the memory to: (i) periodically revise a mirror of the target computing system, according to a predetermined backup schedule, the mirror being stored on the virtual failover volume resident on an appliance that is operatively associated with the target computing system, by: periodically compare the mirror to a configuration of the target computing system to determine changed data blocks relative to the mirror; store the changed data blocks as one or more differential files in the virtual failover volume, the one or more differential files being stored separately from the mirror; and incorporate the changed data blocks into the mirror; (ii) upon the occurrence of a failover event, create a bootable image file from at least one of the mirror and one or more differential files; and (iii) boot the bootable image file via a virtual machine on the appliance to create a virtual failover computing system that substantially corresponds to the target computing system at an arbitrary point in time.

In some embodiments, the present technology may be directed to non-transitory computer readable storage mediums. The storage medium may each have a computer program embodied thereon, the computer program executable by a processor in a computing system to perform a method for maintaining a virtual failover volume of a target computing system that includes: (a) periodically revising a mirror of the target computing system, according to a predetermined backup schedule, the mirror being stored on the virtual failover volume resident on an appliance that is operatively associated with the target computing system, by: (i) periodically comparing the mirror to a configuration of the target computing system to determine changed data blocks relative to the mirror; (ii) storing the changed data blocks as one or more differential files in the virtual failover volume, the one or more differential files being stored separately from the mirror; and (iii) incorporating the changed data blocks into the mirror; (b) upon the occurrence of a failover event, creating a bootable image file from at least one of the mirror and one or more differential files; and (c) booting the bootable image file via a virtual machine on the appliance to create a virtual failover computing system that substantially corresponds to the target computing system at an arbitrary point in time.

DETAILED DESCRIPTION OF EXEMPLARY EMBODIMENTS

Figure 1A:
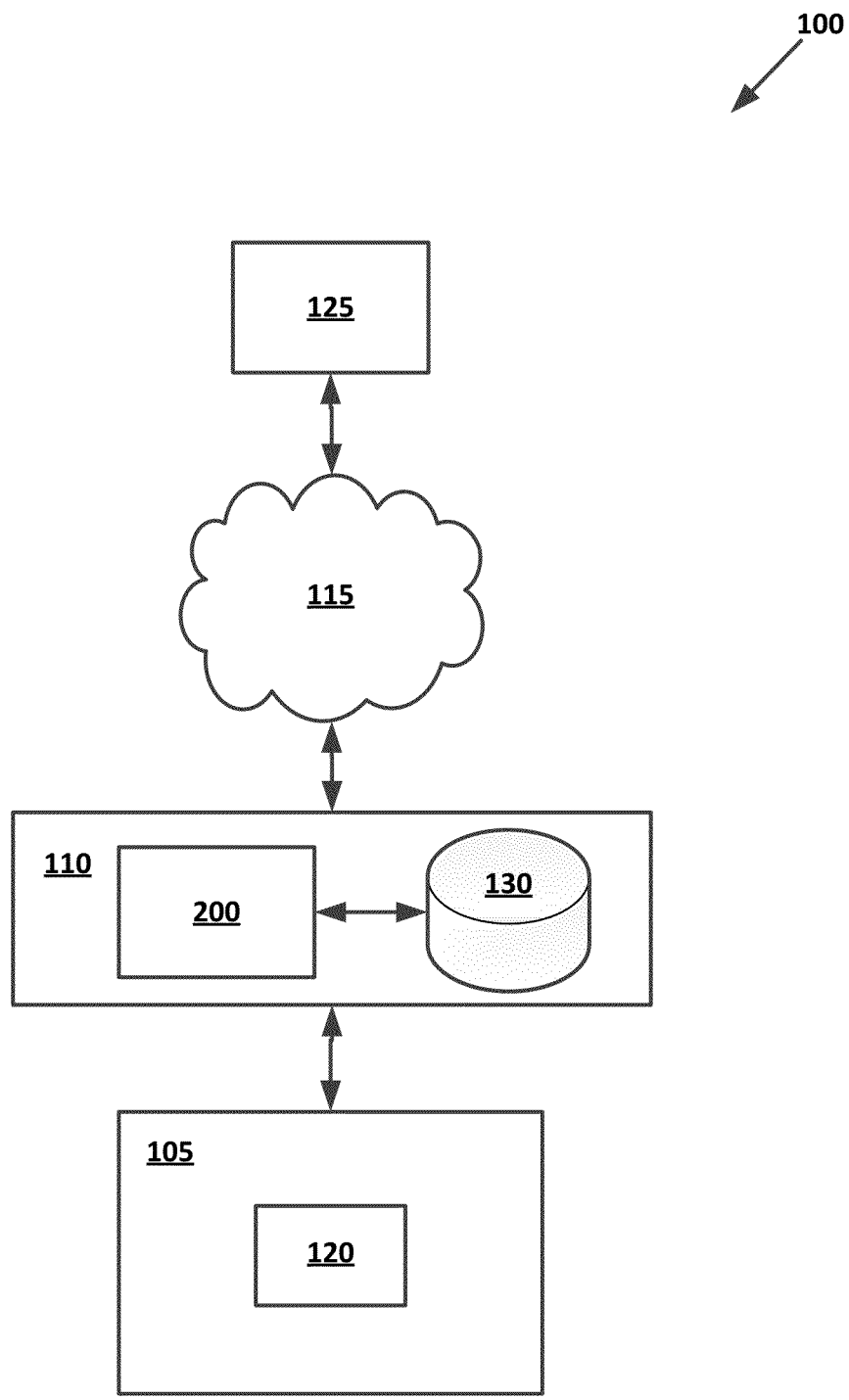
FIG. 1A is a schematic diagram of an exemplary environment for practicing aspects of the present technology.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Virtual failover volumes may often be utilized as redundancy mechanisms for backing up one or more target computing systems in case of failover events (e.g., minor or major failures or abnormal terminations of the target computing systems). The virtual failover volume may include an approximate copy of a configuration of the target computing system. In some embodiments, the configuration of the target computing system may include files stored on one or more hard drives, along with configuration information of the target computing system such as Internet protocol (IP) addresses, media access control (MAC) addresses, and the like. The configuration of the target computing system may additionally include other types of data that may be utilized by a virtual machine to create a virtual failover computing system that closely approximates the configuration of the target computing system.

When backing up the target computing system, the configuration of the target computing system may be transferred to a virtual failover volume according to a backup schedule.

According to some embodiments, methods for backing up the target computing system may include capturing a mirror (also known as a snapshot) of the target computing system. To save space on the virtual failover volume, rather than capturing subsequent mirrors, the systems and methods may capture differential files indicative of changes to the target computing system since the creation of the snapshot, or since the creation of a previous differential file. The differential files may be utilized to update or "revise" the mirror.

It will be understood that because of the relatively small size of differential files relative to the mirror, significant space may be save on the virtual failover volume relative to capturing multiple mirrors. It is noteworthy that differential files may also be known as incremental files, delta files, delta increments, differential delta increments, reverse delta increments, and other permutations of the same.

It will be understood that exemplary methods for creating mirrors and differential files of target computing systems are provided in greater detail with regard to U.S. patent application Ser. No. 12/895,275, entitled "SYSTEMS AND METHODS FOR RESTORING A FILE," filed on Sep. 30, 2010, which is hereby incorporated by reference herein in its entirety, including all references cited therein.

The systems and methods may capture the mirror of the target computing system and store the data blocks of the mirror in a virtual failover volume as a bootable image file by creating a substantially identical copy of the file structure of the target computing system at a given point in time.

As stated above, rather than capturing additional mirrors of the target storage volume, the systems and methods may capture one or more differential files indicative of changes to the target computing system at one or more points in time after the rendering of the mirror. These changes may be stored in files separate from the mirror and may be retained on the virtual failover volume for a predetermined period of time. The systems and methods may be able to utilize these differential files to walk backwards in time to recreate a virtual failover computing system indicative of the configuration of the target computing system at an arbitrary point in time in the past. It will be understood that the further back in time the systems and methods must go to recreate a virtual failover computing system of the target computing system, the longer the process becomes to launch the virtual failover computing system.

If a failover event occurs before the systems and methods have updated the mirror utilizing one or more differential files, the systems and methods may boot the bootable image file and additionally read changed blocks from one or more differential files on the fly by way of a copy on write functionality to create a virtual failover computing system (e.g., rendering a mirror of the target computing system) that approximates the configuration of the target computing system.

Additionally, because the systems and methods of the present technology may utilize a virtual failover volume having new technology file system (NTFS) file system, the systems and methods may be adapted to modify the allocation strategy utilized by the NTFS file structure to more efficiently utilize the virtual storage volume.

Referring now to the drawings, FIG. 1A includes a schematic diagram of an exemplary environment 100 for practicing the present invention. Environment 100 includes a plurality of target computing systems 105 that may each be operatively connected to an appliance 110, hereinafter referred to as "appliance 110." Each of the target computing systems 105 may include a configuration that includes one or more target storage mediums 120 such as hard drives, along with additional operating data. It will be understood that in some embodiments, the target computing system 105 and the appliance 110 may be operative connected via a network 115 may include an encrypted VPN tunnel, a LAN, a WAN, or any other commonly utilized network connection that would be known to one of ordinary skill in the art with the present disclosure before them.

According to some embodiments, each appliance 110 may be associated with a remote storage medium 125 that facilitates long-term storage of at least a portion of the data (e.g., differential files) from the appliances 110 in one or more virtual failover volumes 130.

Generally speaking, the appliance 110 provides local backup services for maintaining a virtual failover volume of the target computing system 105 associated therewith. That is, the appliance 110 may capture a mirror indicative of the target computing system 105 (e.g., storage mediums, configuration information, etc.) and periodically capture differential files indicative of changes to the target computing system 105 relative to the mirror. Upon the occurrence of a failover event (e.g., full or partial failure or malfunction of the target computing system), the appliance 110 may boot the virtual failover volume in a virtual machine as a virtual failover computing system that approximates the target computing system 105 at an arbitrary point in time.

The appliance 110 may include computer readable instructions that, when executed by a processor of the appliance 110, are adapted to maintain a virtual failover volume of the target computing system 105 associated therewith.

Figure 5:
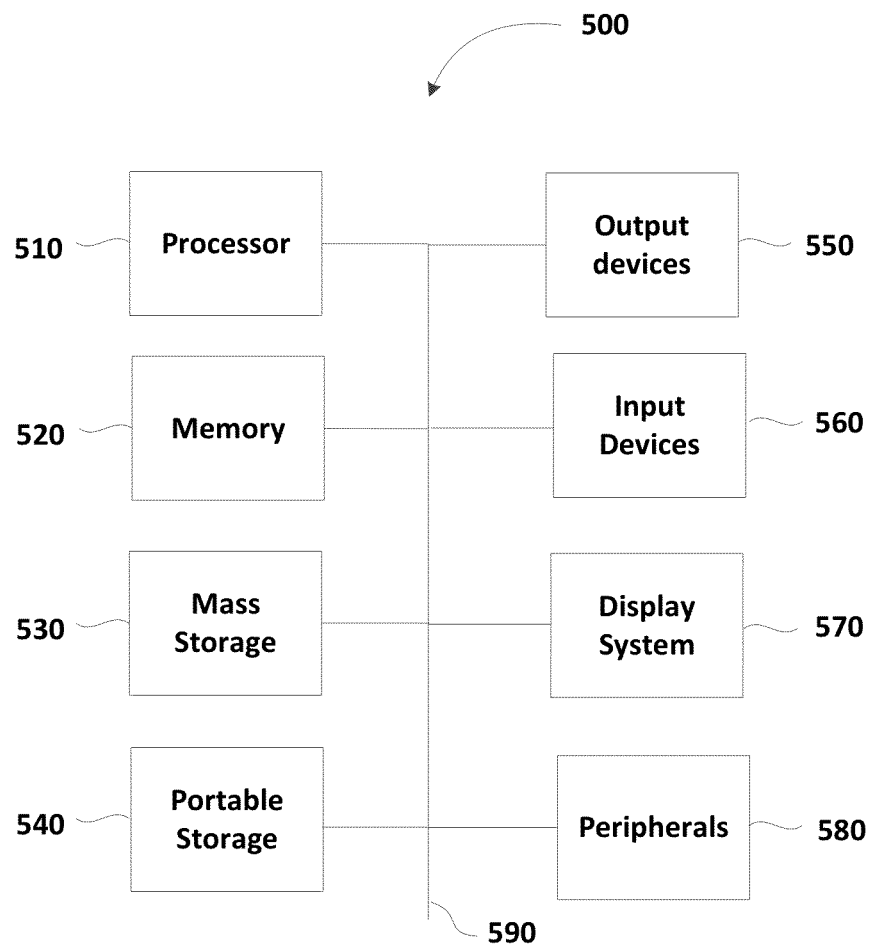
FIG. 5 illustrates an exemplary computing system that may be used to implement embodiments of the present technology.

According to some exemplary embodiments, both the target computing system 105 and the appliance 110 may be generally referred to as "a computing system" such as a computing system 500 as disclosed with respect to FIG. 5. However, it will be understood that the appliance 110 may be referred to as a particular purpose computing system adapted to maintain a virtual failover volume and execute the virtual failover volume utilizing a virtual machine to create a virtual failover computing system that assumes the configuration of the target computing system 105.

Figure 2:
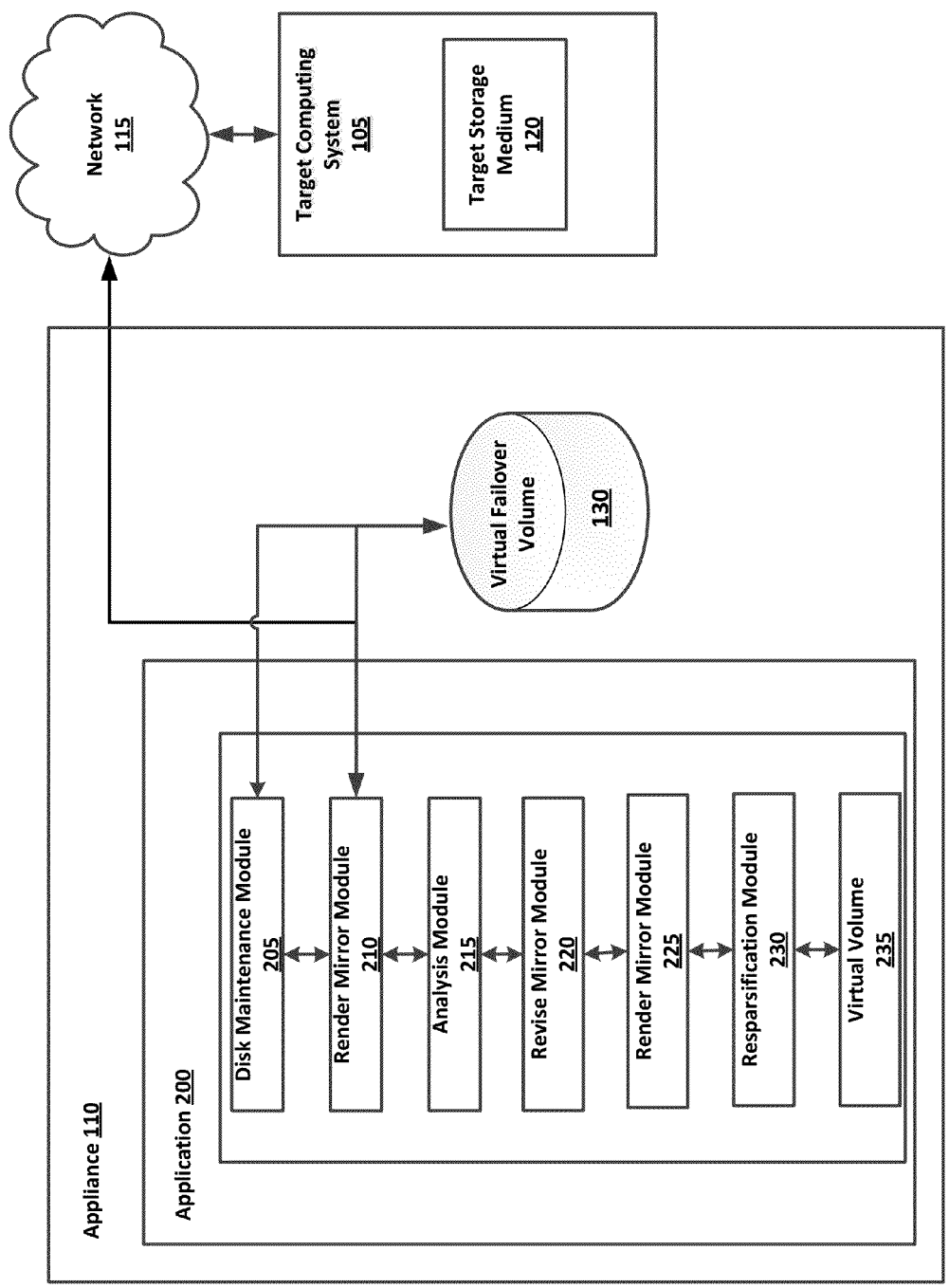
FIG. 2 is a block diagram of a virtual failover application.

Referring now to FIG. 2, a schematic diagram is shown of an exemplary embodiment of the computer readable instructions, which in some embodiments includes an application having one or more modules, engines, and the like. For purposes of brevity, the computer readable instructions are hereinafter referred to as a virtual failover application 200 or "application 200."

According to some embodiments, the application 200 may generally include a disk maintenance module 205, an obtain mirror module 210, an analysis module 215, a revise mirror module 220, a render mirror module 225, a resparsification module 230, and a virtual machine 235. It is noteworthy that the application 200 may be composed of more or fewer modules and engines (or combinations of the same) and still fall within the scope of the present technology.

The disk maintenance module 205 may be adapted to create a virtual failover volume 130 on the appliance 110. According to some embodiments, the disk maintenance module 205 may allocate two terabytes of space for the virtual failover volume 130 for each drive associated with the target computing system 105. In some applications, the disk maintenance module 205 may be adapted to mount the virtual failover volume 130 and format the virtual failover volume 130 utilizing a new technology file system (NTFS) file system. While the disk maintenance module 205 has been disclosed as allocating and formatting a two terabyte virtual failover volume 130 utilizing a NTFS file system, other sizes and formatting procedures that would be known to one of ordinary skill in the art may likewise be utilized in accordance with the present technology.

In some embodiments, the virtual failover volume 130 may include a sparse file. Generally speaking, a sparse file may include a sparse file structure that is adapted to hold, for example, two terabytes worth of data. In practice, while two terabytes worth of space has been allocated, only a portion of the virtual failover volume 130 may actually be filled with data blocks. The rest of the data blocks of the virtual failover volume 130 may be empty or "free," in that they include no actual data other than metadata that may inform the NTFS file system that the blocks are available for writing. When read by the NTFS file system, the NTFS file system may transparently convert metadata representing empty blocks into free blocks filled with zero bytes at runtime.

Figure 1B:
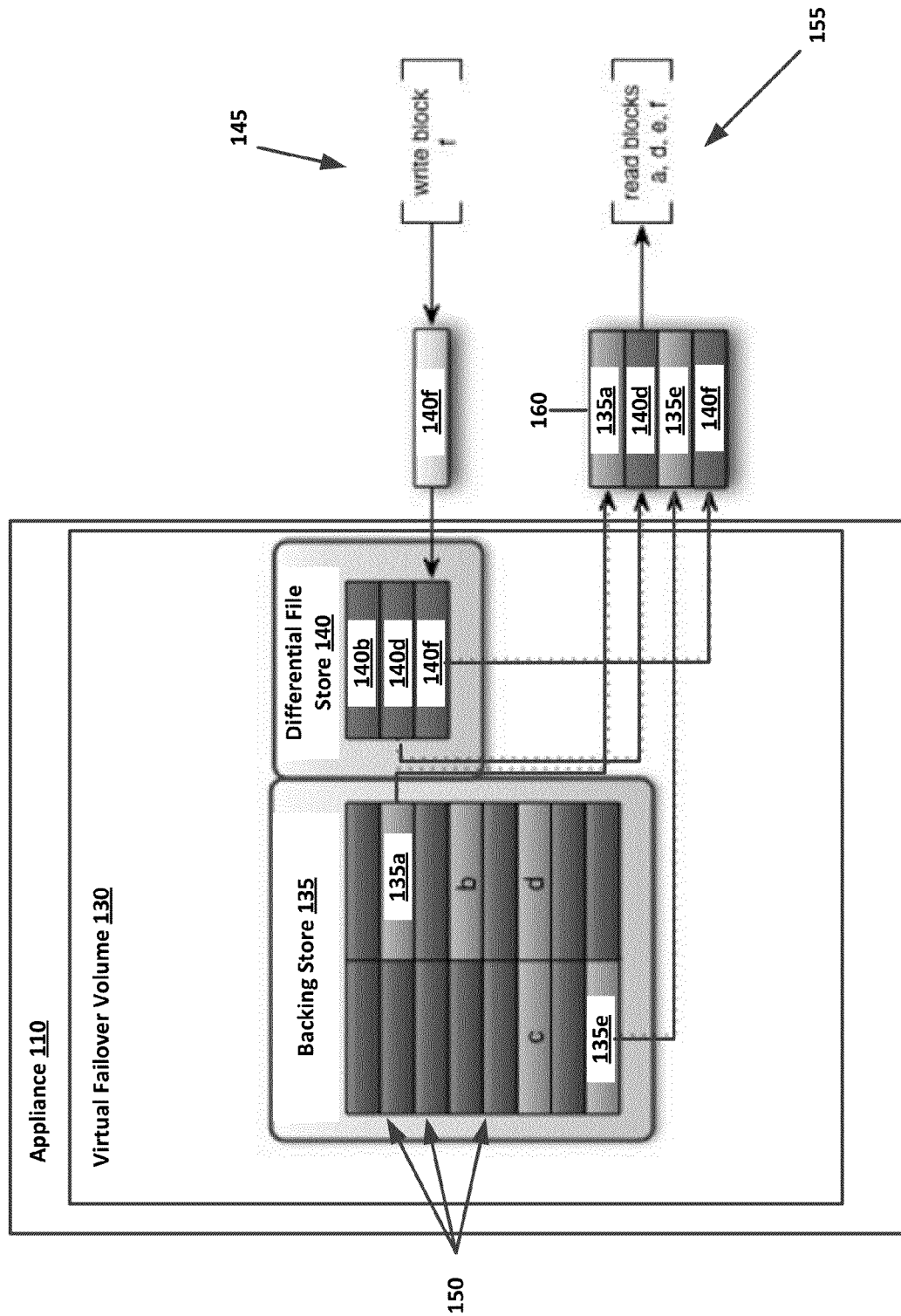
FIG. 1B is a diagrammatical representation of copy-on-write operations performed on a virtual failover volume.

Referring now to FIGS. 1A-B and 2 collectively, according to some embodiments, the virtual failover volume 130 may include a backing store 135 that includes the data blocks copied or moved from the target computing system 105 via the obtain mirror module 210. For example, the backing store 135 may include data blocks such as data block 135a and data block 135e. It will be understood that data block 135a and data block 135e may correspond to a single file or a plurality of files on the target computing system 105, or may include configuration information (e.g., MAC address, IP address, etc.) indicative of the target computing system 105.

In addition to the backing store 135, the virtual failover volume 130 may include additional storage space for one or more differential files in a differential block store 140. For example, the differential block store 140 may include differential files 140b, 140d, and 140f that are indicative of changes to one or more files of the target computing system 105 relative to the backing store 135.

It will be understood that the differential block store 140 may be stored separately from the backing store 135 on the virtual failover volume 130, along with sufficient working space to accommodate a copy of the set of differential files created during subsequent backups of the target computing system 105. Moreover, the virtual failover volume 130 may also include additional operating space (not shown) for the virtual machine 235 to operate at a reasonable level (e.g., files created or modified by the virtual failover computing system) for a given period of time, which in some cases is approximately one month.

It will be understood that because direct modification of the backing store 135 via the virtual machine 235 may lead to corruption of the backing store 135, the differential files may be stored separately from the backing store 135 in the differential block store 140. Therefore, the analysis module 215 may be adapted to utilize a copy on write functionality to store differential files separately from the backing store 135. An exemplary "write" operation 145 illustrates a differential file 140f being written into the differential block store 140.

In some applications, changed data blocks included in the one or more differential files may be incorporated into the backing store 135 via the revise mirror module 220, as will be discussed in greater detail below. However, it will be understood that once the virtual machine 235 has booted the bootable image file of the virtual failover volume 130, the application 200 may read (rather than directly open) data blocks from the backing store 135 and the one or more differential files independently from one another, utilizing a copy on write functionality. Utilization of the copy on write functionality may prevent changes to the backing store 135 that may occur if the backing store 135 is opened by the NTFS file system. It is noteworthy that directly opening the backing store 135 may modify the backing store 135 and compromise the integrity of the backing store 135.

Upon an initial preparation of the virtual failover volume 130 by the disk maintenance module 205, each of the blocks of the backing store 135 is a "free" or sparse block such that the obtain mirror module 210 may move or "copy" the blocks of data from the target computing system 105 to the sparse blocks of the backing store 135. Exemplary empty or "free" blocks of the backing store 135 are shown as free blocks 150. Moreover, the backing store 135 may include occupied blocks such as 135a and 135e indicative of data blocks copied from the target computing system 105.

As stated above, the obtain mirror module 210 may be executed to copy data blocks from the target computing system 105 into the backing store 135 to occupy at least a portion of the free blocks 150 to create a mirror or "snapshot" of the target computing system 105. It will be understood that the backing store 135 may be stored as a bootable image file, such as a Windows® root file system, that may be executed by the virtual machine 235. In some embodiments, the virtual machine 235 may utilize a corresponding Windows® operating system to boot the bootable image file.

The analysis module 215 may be executed periodically (typically according to a backup schedule) to determine the changed data blocks of the target computing device 105 relative to the data blocks of the backing store 135. The determined changed data blocks may be stored in the differential block store 140 as one or more differential files. In some embodiments, each execution of the analysis module 215 that determines changed blocks results in the creation of a separate differential file.

Changed blocks stored in the differential block store 140 that are obtained by the analysis module 215 may be utilized by the revise mirror module 220 to revise the mirror (e.g., backing store 135) of the target computing system 105. It will be understood that the process of revising the mirror may occur according to a predetermined backup schedule.

Upon the occurrence of a failover event, the render mirror module 225 may utilize the mirror alone, or the mirror and the revised differential file, to render a bootable image file from one or more mirrors, and/or one or more mirrors and one or more differential files to create a virtual failover computing system that approximates the configuration of the target computing system 105 at an arbitrary point in time. In contrast to backup methods that store data blocks to a backup storage medium in an unorganized (e.g., not substantially corresponding to a root file system of the target computing system) manner, the backup methods utilized by the appliance 110 (e.g., the mirror and differential files are stored in a virtual failover volume 130) allow for the quick and efficient rendering of bootable disk images.

It will be understood that these bootable disk images may be utilized by the virtual machine 235 to launch a virtual failover computing system that approximates the configuration of the target computing system 105 at an arbitrary point in time without substantial delay caused by copying all of (or even a substantial portion) the backed-up data blocks from an unorganized state to a bootable image file that approximates the root file system of the target computing system upon the occurrence of the failover event.

According to some embodiments, to facilitate rapid failover to the virtual machine 235, the application 200 may be adapted to utilize a revisable differential file. As such, the analysis module 215 may be adapted to periodically update a revisable differential file. In some embodiments, the analysis module 215 may update the revisable differential file by comparing the revisable differential file to the current configuration of the target computing system to determine changed data blocks relative to the revisable differential file. Next, the analysis module 215 may combine the determined changed data blocks into the revisable differential file to create an updated differential file that takes the place of the revisable differential file. Moreover, rather than discarding the revisable differential file, it may be stored in a differential file archive located on at least one of the remote storage device 125 of the virtual failover volume 130.

As such, the virtual failover volume 130 may be kept in a "ready to execute" format such that upon the occurrence of a failover event, the render mirror module 225 may be executed to render the mirror and the revisable differential file to create a bootable image file that is utilized by the virtual machine 235 to establish a virtual failover computing system that substantially corresponds to the configuration of the target computing system 105 as it existed right before the occurrence of the failover event.

During operation of the virtual machine 235, if the virtual machine 235 reads a file from the virtual failover volume 130, the virtual machine 235 may utilize data blocks from the differential block store 140, in addition to data blocks from the backing store 135. The virtual machine 235 may utilize copy on write functionalities to obtain data blocks from the backing store 135 along with data blocks from the differential block store 140 that are situated temporally between the mirror and an arbitrary point in time. The combination of the data blocks allows the virtual machine 235 to recreate the file approximately as it appeared on the target computing system 105 at the arbitrary point in time.

With particular emphasis on FIG. 1B, in an exemplary operation 155, the virtual machine 235 may recreate a file 160 by utilizing a "read" copy on write functionality to read data blocks 135a and 135e from the backing store 135 and differential files 140d and 140f from the differential block store 140. The virtual machine 235 assembles the data blocks and differential files to create the file 160.

In addition to launching the virtual machine 235 to create a virtual failover computing system that approximates configuration of the target computing system 105, the virtual failover computing system may utilize additional configuration details of the target computing system 105, such as a media access control (MAC) address, an Internet protocol (IP) address, or other suitable information indicative of the location or identification of the target computing system 105. The virtual machine 235 may also update registry entries or perform any other necessary startup operations such that the virtual failover computing system may function substantially similarly to the target computing system 105.

During operation, the virtual machine 235 may also create, delete, and modify files just as the target computing system 105 would, although changed data blocks indicative of the modify files may be stored in the additional operating space created in the virtual failover volume 130. Moreover, data blocks may be deleted from the virtual failover volume 130.

Because the virtual failover volume 130 may utilize NTFS file system, allocation strategies may cause the virtual machine 235 to overlook deleted blocks that have not been converted to free blocks by the NTFS file system. For example, modifications to the backing store 135 by the revise mirror module 220 and routine deletion of differential files from the differential data store 140 may result in deleted blocks. It will be understood that a deleted block is a data block that has been marked for deletion by the NTFS file system, but that still retains a portion of the deleted data block.

Allocation strategies of the NTFS file system may cause data blocks that are being written into the virtual failover volume 130 to be written into the next available free block(s), leading to desparsification. To counteract this desparsification, the resparsification module 230 may be adapted to resparsify the virtual failover volume 130. In some embodiments, the NTFS file system may notify the underlying XFS file system of the appliance 110 (which holds the backing store 135), to resparsify the one or more deleted blocks, returning them to the sparse state.

Figure 3:
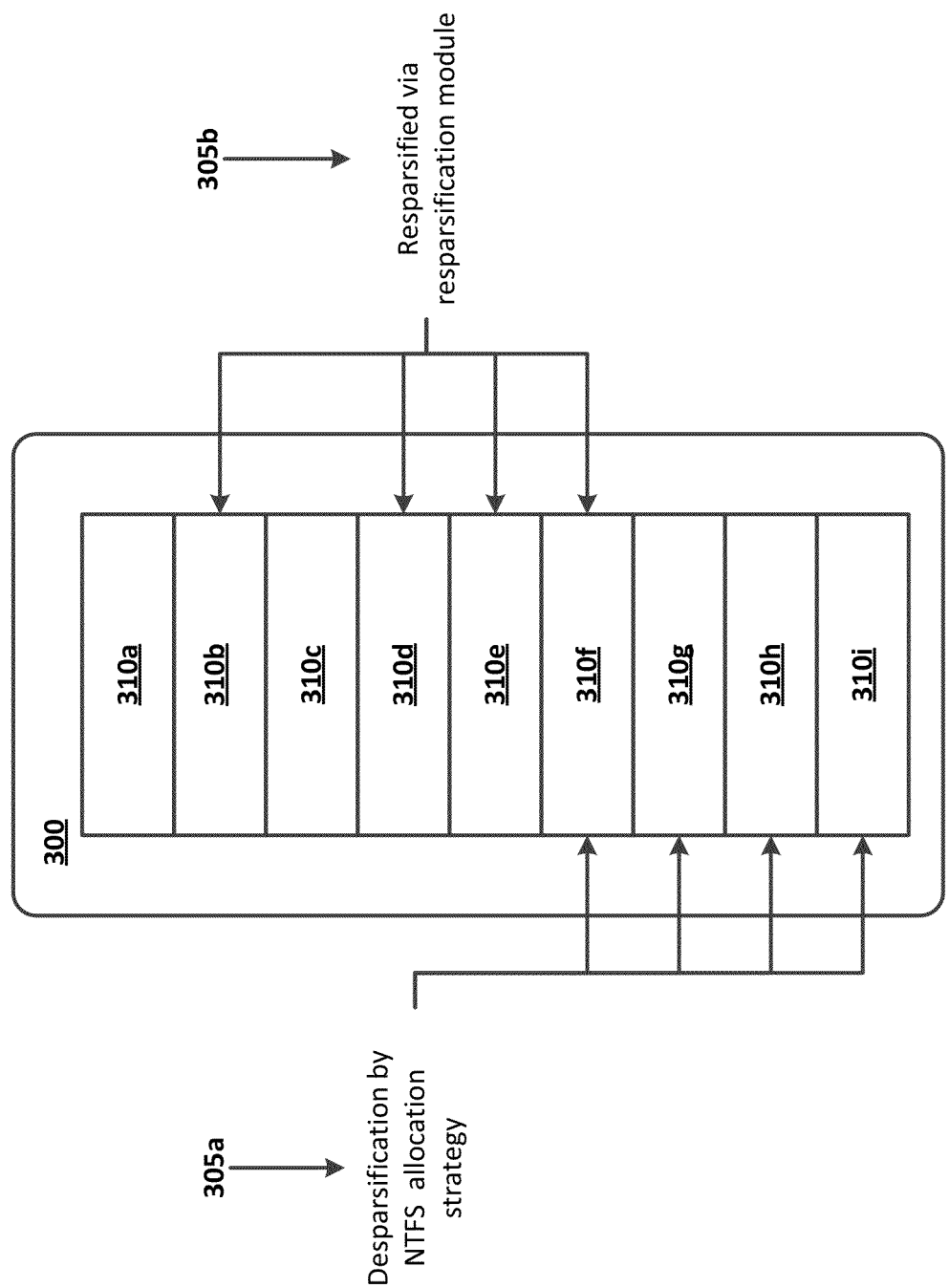
FIG. 3 is a diagrammatical representation of the desparsification and resparsification of the virtual failover volume.

FIG. 3 illustrates the desparsification operation 305a of a portion of the backing store 300 by the NTFS file system when the NTFS file system attempts to write four data blocks into the backing store 300. The backing store 300 is shown as including occupied blocks 310a and 310c, along with deleted blocks 310b, 310d, and 310e, and sparse blocks 310f-i. It will be understood that the allocation strategy of the NTFS files system begins selecting the first block 310a at the beginning of the portion of the backing store 300. Without the resparsification of the backing store 300 via the resparsification module 230, the allocation strategy would have selected sparse blocks 310f-i, thus desparsifying four blocks 310f-i instead of one, such as block 310f.

The resparsification module 230 may be adapted to perform a resparsification operation 305b on the backing store 300. For example, resparsification module 230 may be adapted to cause the NTFS file system to notify the underlying XFS file system of the appliance 110 (which holds the backing store 135), to resparsify the deleted blocks 310b, 310d, and 310e. As such, data may be written to the resparsified blocks 310b, 310d, 310e, desparsifying only one data block 310f.

While the resparsification module 230 has been disclosed within the context of maintaining virtual failover volumes of target computing systems, the applicability of resparsifying a virtual volume may extend to other systems and methods that would benefit from the ability of one or more virtual machines to efficiently store data on a virtual volume.

In additional embodiments, the application 200 may be adapted to optimize the virtual failover volume 130 by limiting metadata updates to the virtual failover volume 130 by the NTFS file system.

The backing store 135 may be utilized by the virtual machine 235 as a file (e.g., bootable disk image) that may be stored in an XFS file system on the appliance 110. Whenever data blocks are written to the appliance 110, the XFS file system may commit a metadata change to record an "mtime" (e.g., modification time) of a data block. Moreover, because some virtual machines 230 may utilize a semi-synchronous NTFS file system within the backing store 135, a very high quantity of 512 byte clusters may be written, each invoking a metadata update to the virtual machine XFS file system. These metadata updates cause the virtual machine XFS file system to serialize inputs and outputs behind transactional journal commits, causing deleterious performance of the virtual machine 235.

To alleviate the 'mtime' updates, the virtual machine 235 may be adapted to open files (comprised of data blocks or differential data blocks) using a virtual machine XFS internal kernel call that may open a file by way of a handle. The virtual machine 235 may use this method for both backup and restore functionality. Therefore, a file opened utilizing this method may allow the virtual machine 235 to omit "mtime" updates, thereby reducing journal commits and significantly improving write performance.

Moreover the virtual machine 235 may utilize memory efficient data block locking functionalities for asynchronous input and output actions. That is, the functionality utilized by the virtual machine 235 may be inefficient at memory utilization, especially when locking data blocks during asynchronous input and/or output actions.

Therefore, the virtual machines 230 utilized in accordance with the present technology may be adapted to utilize alternate lock management systems which create locks as needed and store the locked data blocks in a 'splay-tree' while active. The splay tree is a standard data structure that provides the virtual machine 235 with the ability to rapidly lookup of node while modifying the root node to be near recently accessed data blocks. By storing only needed data locks in a small, fast, splay tree, the memory footprint of the appliance 110 may be reduced without an associated compromise of lookup speed. It will be understood that large virtual failover volumes may be access using this method.

According to some embodiments, upon repair of the target computing system 105, also known as a "bare metal restore," the virtual machine 235 may be paused or "locked." Pausing the virtual machine 235 preserves the state of the virtual failover volume 130. Moreover, the paused virtual failover volume 130 may be copied directly to the repaired target computing system allowing for a virtual to physical conversion of the virtual failover volume 130 to the target storage medium 120 of the repaired target computing device.

Upon the occurrence of the virtual to physical operation, the bootable image file created from the virtual failover volume 130 may be discarded and the virtual failover volume 130 may be returned to a data state that approximates the data state of the virtual failover volume 130 before the bootable image file was created by the obtain mirror module 210.

The virtual failover volume 130 may then be reutilized with the repaired target computing system.

Figure 4:
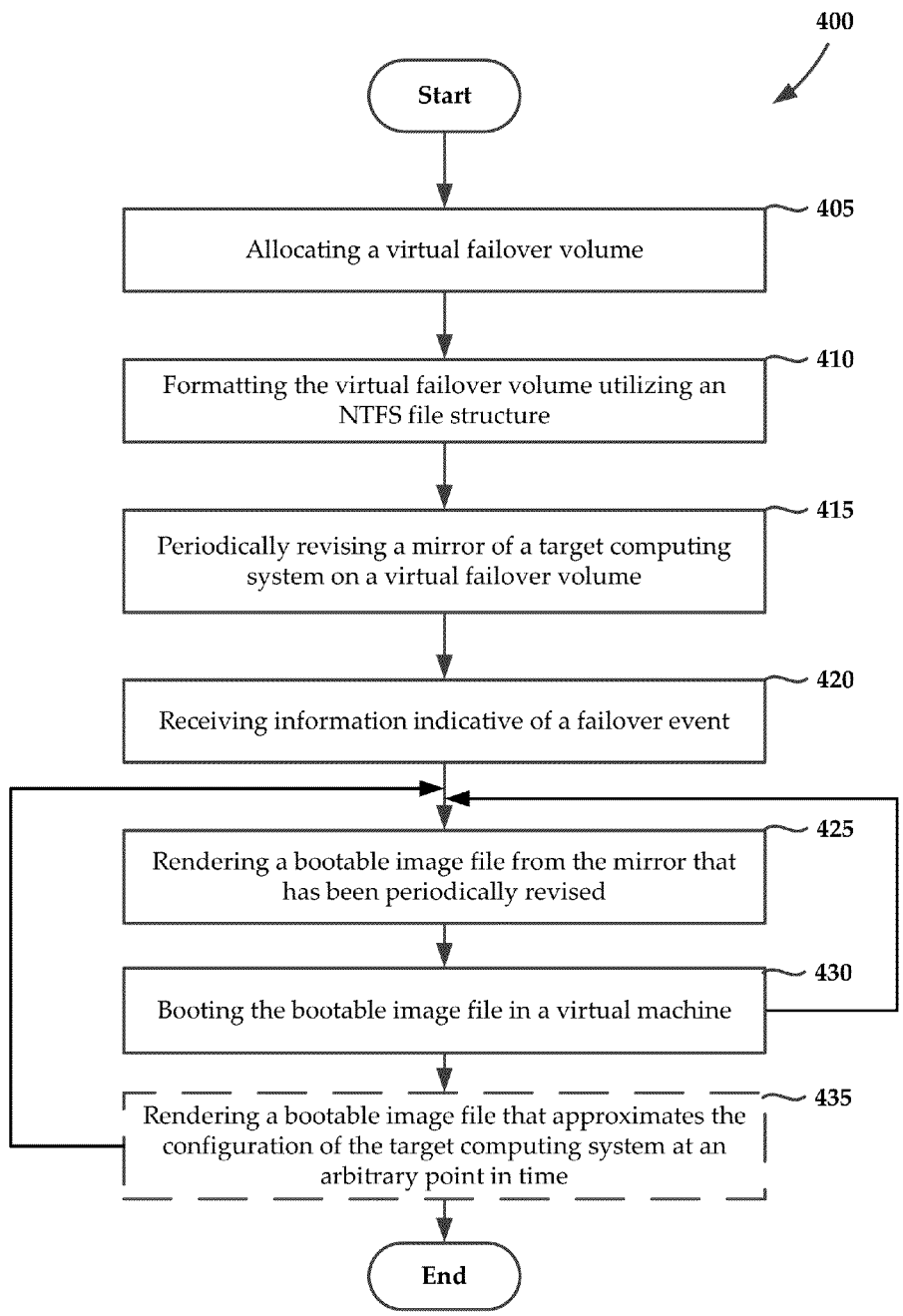
FIG. 4 is a flowchart of an exemplary method for maintaining a virtual failover volume and launching the virtual failover volume via a virtual machine.

Referring now to FIG. 4, an exemplary method 400 for maintaining a virtual failover volume of a target computing system is shown therein. The method 400 may include the step 405 of allocating a virtual failover volume having a two terabyte size, and a step 410 of formatting the virtual failover volume utilizing an NTFS file structure.

In some embodiments, the method 400 may include the step 415 of periodically obtaining a mirror of a target computing system on a virtual failover volume as a bootable image file. The step 415 may include periodically comparing the mirror to a configuration of the target computing system to determine changed data blocks relative to the mirror, and storing the changed data blocks as one or more differential files in the virtual failover volume, the one or more differential files being stored separately from the mirror. It will be understood that the periodically obtained mirrors may be stored on a virtual volume as a Windows® root file system.

Next, the method 400 may include the step 420 of receiving information indicative of a failover event (e.g., failure of the target computing system). Upon information indicative of a failover event, the method 400 may include the step 425 of rendering a bootable image file from the mirror that has been periodically revised.

Next, the method 400 may include the step 430 of booting the bootable image file via a virtual machine to create a virtual failover computing system. It will be understood that the configuration of the virtual failover computing system may closely approximate the configuration of the target computing system at the failover event.

In some embodiments, the method 400 may include an optional step 435 of rendering a bootable image file that approximates the configuration of the target computing system at an arbitrary point in time utilizing one or more mirrors and one or more differential files, rather than only utilizing the mirror. The step 435 may include walking the mirror back in time utilizing the one or more differential files to recreate the configuration of the target computing system as it was at the arbitrary point in time.

FIG. 5 illustrates an exemplary computing system 500 that may be used to implement an embodiment of the present technology. The system 500 of FIG. 5 may be implemented in the contexts of the target computing devices 105 (also referred to as target computing system(s) 105) and the appliance 110. The computing system 500 of FIG. 5 includes one or more processors 510 and main memory 520. Main memory 520 stores, in part, instructions and data for execution by processor 510. Main memory 520 may store the executable code when in operation. The system 500 of FIG. 5 further includes a mass storage device 530, portable storage medium drive(s) 540 (also referred to as portable storage device 540), output devices 550, user input devices 560 (also referred to as input devices 560), a graphics display 570 (also referred to as display system 570), and peripheral devices 580.

The components shown in FIG. 5 are depicted as being connected via a single bus 590. The components may be connected through one or more data transport means. Processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present invention for purposes of loading that software into main memory 520.

Portable storage device 540 operates in conjunction with a portable non-volatile storage medium, such as a floppy disk, compact disk, digital video disc, or USB storage device, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. Peripheral device(s) 580 may include a modem or a router.

The components provided in the computer system 500 of FIG. 5 are those typically found in computer systems that may be suitable for use with embodiments of the present invention and are intended to represent a broad category of such computer components that are well known in the art. Thus, the computer system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for maintaining a virtual failover volume of a target computing system, the method comprising:
periodically revising a mirror of the target computing system, according to a predetermined backup schedule, the mirror being stored on the virtual failover volume resident on an appliance that is operatively associated with the target computing system, by:
periodically comparing the mirror to a configuration of the target computing system to determine changed data blocks relative to the mirror;
storing the changed data blocks as one or more differential files in the virtual failover volume using a copy-on-write functionality, the one or more differential files being stored separately from the mirror; and
incorporating the changed data blocks into the mirror;
upon the occurrence of a failover event, creating a bootable image file from at least one of the mirror and one or more differential files using a copy-on-write functionality to prevent modification of the one or more differential files; and
booting the bootable image file via a virtual machine on the appliance to create a virtual failover computing system that substantially corresponds to the target computing system at an arbitrary point in time.

2. The method according to claim 1, further comprising creating the virtual failover volume on the appliance.

3. The method according to claim 2, further comprising formatting the virtual failover volume as a two terabyte sparse file, utilizing a new technology file system (NTFS) file system.

4. The method according to claim 2, wherein if the target computing system includes two or more storage mediums, the step of creating includes creating a virtual failover volume for each of the two or more storage mediums, each of the two or more storage mediums being formatted as a two terabyte sparse file, utilizing a new technology file system (NTFS).

5. The method according to claim 3, further comprising resparsifying the virtual failover volume by determining data blocks marked for deletion on the virtual failover volume and freeing the data blocks marked for deletion by informing the virtual machine that the data blocks marked for deletion are available for reuse.

6. The method according to claim 1, wherein periodically revising the mirror of the target computing system includes moving data blocks from the target computing system into a backing store, the backing store including a root file system utilizable by an operating system of a virtual machine.

7. The method according to claim 1, wherein creating the bootable image file includes:
inheriting copy data blocks from the mirror into the bootable image file; and
inheriting changed data blocks from the differential file into the bootable image file.

8. The method according to claim 1, further comprising periodically updating a revisable differential file by:
comparing the revisable differential file to the target computing system to determine changed data blocks relative to the revisable differential file; and
combining the determined changed data blocks into the revisable differential file.

9. The method according to claim 8, wherein the revisable differential file is stored in a differential file archive on the virtual failover volume each time the step of periodically updating the revisable differential file is executed.

10. The method according to claim 1, further comprising rendering a previous mirror of the target computing system at an arbitrary point in time by utilizing one or more mirrors and one or more differential files.

11. The method according to claim 1, further comprising executing the virtual machine to boot the bootable image file upon receiving information indicative of an occurrence of a failover event.

12. The method according to claim 11, wherein the virtual machine is adapted to access files from the virtual failover volume by utilizing a copy-on-write functionality to gather at least one of the data blocks corresponding to the file from the mirror and changed data blocks corresponding to one or more of the files from the one or more differential files.

13. The method according to claim 12, further comprising utilizing a copy-on-write functionality to store data blocks created by the virtual machine on the virtual failover volume.

14. A system for maintaining a virtual failover volume of a file structure of a target computing system, the system comprising:
 a memory for storing computer readable instructions for maintaining the virtual failover volume of the file structure of a target computing system; and
 a processor configured to execute the instructions stored in the memory to:
  periodically revise a mirror of the target computing system, according to a predetermined backup schedule, the mirror being stored on the virtual failover volume resident on an appliance that is operatively associated with the target computing system, by:
   periodically comparing the mirror to a configuration of the target computing system to determine changed data blocks relative to the mirror;
   storing the changed data blocks as one or more differential files in the virtual failover volume using a copy-on-write functionality, the one or more differential files being stored separately from the mirror; and
   incorporating the changed data blocks into the mirror;
  upon the occurrence of a failover event, create a bootable image file from at least one of the mirror and one or more differential files using a copy-on-write functionality to prevent modification of the one or more differential files; and
  boot the bootable image file via a virtual machine on the appliance to create a virtual failover computing system that substantially corresponds to the target computing system at an arbitrary point in time.

15. The system according to claim 14, wherein the processor is further configured to execute the instructions stored in the memory to create the virtual failover volume on the appliance.

16. The system according to claim 15, wherein the processor is further configured to execute the instructions stored in the memory to format the virtual failover volume as a two terabyte sparse file, utilizing a new technology file system (NTFS) file system.

17. The system according to claim 15, wherein if the file structure includes two or more file structures, the processor is further configured to execute the instructions stored in the memory to create a virtual failover volume for each of the two or more storage mediums, each of the two or more storage mediums being formatted as a two terabyte sparse file, utilizing a new technology file system (NTFS).

18. The system according to claim 16, wherein the processor is further configured to execute the instructions stored in the memory to resparsify the virtual failover volume by determining data blocks marked for deletion on the virtual failover volume and freeing the data blocks marked for deletion by informing the virtual machine that the data blocks marked for deletion are available for reuse.

19. The system according to claim 14, wherein periodically revise includes moving data blocks from the target computing system into a backing store, the backing store including a root file system utilizable by an operating system of a virtual machine.

20. The system according to claim 14, wherein creating the bootable image file includes:
 inheriting copy data blocks from the mirror into the bootable image file; and
 inheriting changed data blocks from the differential file into the bootable image file.

21. The system according to claim 14, wherein the processor is further configured to execute the instructions stored in the memory to periodically update a revisable differential file by:
 comparing the revisable differential file to the target computing system to determine changed data blocks relative to the revisable differential file; and
 combining the determined changed data blocks into the revisable differential file.

22. The system according to claim 21, wherein the revisable differential file is stored in a differential file archive on the virtual failover volume each time the computer readable instructions periodically update the revisable differential file.

23. The system according to claim 14, wherein the processor is further configured to execute the instructions stored in the memory to render a previous mirror of the target computing system at an arbitrary point in time by utilizing one or more mirrors and one or more differential files.

24. The system according to claim 14, wherein the processor is further configured to execute the instructions stored in the memory to execute the virtual machine to boot the bootable image file upon an occurrence of a failover event.

25. The system according to claim 24, wherein the virtual machine is adapted to access files from the virtual failover volume by utilizing a copy-on-write functionality to gather at least one of data blocks corresponding to the file from the mirror and changed data blocks corresponding to one or more of the files from the one or more differential files.

26. A non-transitory computer readable storage medium having a computer program embodied thereon, the computer program executable by a processor in a computing system to perform a method for maintaining a virtual failover volume of a target computing system, the method comprising:
 periodically revising a mirror of the target computing system, according to a predetermined backup schedule, the mirror being stored on the virtual failover volume resident on an appliance that is operatively associated with the target computing system, by:
  periodically comparing the mirror to a configuration of the target computing system to determine changed data blocks relative to the mirror;
  storing the changed data blocks as one or more differential files in the virtual failover volume using a copy-on-write functionality, the one or more differential files being stored separately from the mirror; and
  incorporating the changed data blocks into the mirror;
 upon the occurrence of a failover event, creating a bootable image file from at least one of the mirror and one or more differential files using a copy-on-write functionality to prevent modification of the one or more differential files; and
 booting the bootable image file via a virtual machine on the appliance to create a virtual failover computing system that substantially corresponds to the target computing system at an arbitrary point in time.

27. A method for maintaining a virtual failover volume of a target computing system, the method comprising:

periodically revising a mirror of the target computing system according to a predetermined backup schedule, the mirror being stored on the virtual failover volume resident on an appliance that is operatively associated with the target computing system;

periodically updating a revisable differential file by:
   comparing a configuration of the target computing system to at least one of the mirror and the revisable differential file to determine changed data blocks relative to at least one of the mirror and the revisable differential file; and
   incorporating the changed data blocks into the revisable differential file using a copy-on-write functionality, the revisable differential file being stored separately from the mirror;

creating a bootable image file that substantially corresponds to the configuration of the target computing system upon the occurrence of a failover event by combining data blocks of the revisable differential file with a current mirror using a copy-on-write functionality to prevent modification of the one or more differential files; and booting the bootable image file via a virtual machine on the appliance to create a virtual failover computing system that substantially corresponds to the configuration of the target computing system at a point in time immediately before the failover event.

* * * * *